Dec. 14, 1965 W. R. DUFENDACH ETAL 3,223,956

INSTRUCTION APPARATUS FOR CLASSROOMS

Original Filed Sept. 12, 1960 8 Sheets-Sheet 1

Inventors:
Merlin J. Applegate,
William R. Dufendach,
by Hood, Gust and Irish
Attorneys.

Dec. 14, 1965 W. R. DUFENDACH ETAL 3,223,956

INSTRUCTION APPARATUS FOR CLASSROOMS

Original Filed Sept. 12, 1960 8 Sheets-Sheet 2

Inventors:
Merlin J. Applegate,
William R. Dufendach,
by Hood, Gust and Irish
Attorneys.

Dec. 14, 1965 W. R. DUFENDACH ETAL 3,223,956

INSTRUCTION APPARATUS FOR CLASSROOMS

Original Filed Sept. 12, 1960 8 Sheets-Sheet 3

Inventors:
Merlin J. Applegate,
William R. Dufendach,
by Hood, Gust and Irish
Attorneys.

Dec. 14, 1965 W. R. DUFENDACH ETAL 3,223,956

INSTRUCTION APPARATUS FOR CLASSROOMS

Original Filed Sept. 12, 1960 8 Sheets-Sheet 4

Inventors:
Merlin J. Applegate,
William R. Dufendach,
by Hood, Gust & Irish
Attorneys.

Dec. 14, 1965 W. R. DUFENDACH ETAL 3,223,956

INSTRUCTION APPARATUS FOR CLASSROOMS

Original Filed Sept. 12, 1960 8 Sheets-Sheet 5

Inventors:
Merlin J. Applegate,
William R. Dufendach,
by Hood, Gust & Irish
Attorneys Inventors:
Merlin J. Applegate,
William R. Dufendach,
by Hood, Gust & Irish
Attorneys.

INSTRUCTION APPARATUS FOR CLASSROOMS

Original Filed Sept. 12, 1960

Inventors:
Merlin J. Applegate,
William R. Dufendach,
by Hood, Gust & Irish
Attorneys.

Dec. 14, 1965 W. R. DUFENDACH ETAL 3,223,956

INSTRUCTION APPARATUS FOR CLASSROOMS

Original Filed Sept. 12, 1960 8 Sheets-Sheet 8

Inventors:
Merlin J. Appegate,
William R. Dufendach,
by Hood, Gust, Irish & Lundy
Attorneys.

3,223,956

INSTRUCTION APPARATUS FOR CLASSROOMS

William R. Dufendach and Merlin J. Applegate, both of Grand Rapids, Mich., assignors to American Seating Company, Grand Rapids, Mich.

Original application Sept. 12, 1960, Ser. No. 60,111, now Patent No. 3,147,555, dated Sept. 8, 1964. Divided and this application May 5, 1964, Ser. No. 365,029
8 Claims. (Cl. 339—14)

This is a divisional application of application Serial No. 60,111, filed September 12, 1960, entitled "Electronic Apparatus for Classroom Instruction," now Patent No. 3,147,555.

The present invention relates to electronic apparatus for classroom instruction and more particularly to apparatus used in the fields of teaching foreign languages, speech therapy, remedial reading, student tutoring, public speaking, voice training, and the like. The invention comprehends the supervision and teaching by a single instructor of a plurality of students simultaneously.

With respect to classroom instruction, electronic apparatuses and systems have heretofore been used for instructional purposes. Such prior apparatuses and systems have suffered from certain inherent defects and shortcomings in many different respects, such as in failing to provide a sufficient number of electronic facilities, of placing an extra burden on the instructor, of failing to provide adequate supervision and controls, and of unreliability in the operation of the equipment. Such apparatuses and devices have heretofore incorporated magnetic tape recorders and reproducers whereby the students may receive prerecorded lessons and make oral responses which are recorded and later monitored by either the instructor or student, or both. These apparatuses and devices have not been entirely satisfactory, again for many different reasons, but primarily because of lack of flexibility in transmitting a lesson to the student, recording the oral responses of the student, playing back the oral responses to the student or to the instructor, and performing these operations either conjointly or separately. It has been discovered that complete flexibility of operation is required in giving classroom instruction simultaneously to a plurality of students and further that in giving individualized instruction, the operation of the system must be relatively simple and immediately convenient for the instructor in order to maintain the efficacy of the overall system.

While the principles of the present invention may be employed in the fields of foreign language instruction, speech therapy, remedial reading, student tutoring, public speaking, voice training and the like, the following comments and description of the present invention will proceed with reference to the field of teaching languages. It has been learned that in teaching a language to a class of students, it is desirable for each student to have individualized instruction throughout the class period, such instruction being paced to maintain the level of learning of the respective students. This obviously means that since some students learn more rapidly than others, more advanced lessons must be given to these students while the slower students should be given the less advanced lessons.

In teaching languages, it is necessary for the student not only to hear the oral presentation but to speak it and then to monitor his spoken responses. Also, the student may speak in a translation of the language lesson and have this monitored by a recording device by the instructor or by another student.

These requirements in an efficient and efficacious system are accomplished with complete flexibility in the present invention through the provision of a plurality of magnetic tape reproducers, combination magnetic tape reproducing and playback devices, an instructor's amplifying station, a plurality of student-receiving stations, and unique apparatuses for switching these components into and out of circuitry with each other whereby an almost indefinite number of possible circuit configurations may be achieved. Among these possible configurations are the ones whereby a master tape recorded lesson may be transmitted to a given number of students simultaneously, the students' oral responses recorded, the oral responses along with the master lesson played back to the students or to the instructor, the establishment of communication between selected students whereby the language may be spoken therebetween, communication between one or more students and the instructor, and many other possible circuit configurations too numerous to mention.

Contributing to the provision of these innumerable possible circuit configurations in the present invention is a unique switching device which makes use of printed circuits and avoids all use of rotary and the like switches. Through the use of this unique switching apparatus, a very large percentage of the soldered connections which would normally be used are eliminated. Also, the reliability and ruggedness of the system are improved, while at the same time the size of the overall assembly is reduced. There is also accomplished a more facile selection of a particular program or circuit connection and the identification of the selected circuit.

It is an object of this invention to provide an electronic system for classroom instruction which includes an improved and unique switching assembly for establishing selectively a number of different electrical circuits to a plurality of student stations whereby the students may simultaneously receive different lessons, record their responses, receive instruction directly from an instructor, have the recorded responses played back, communicate with each other and the instructor and the like, all under the supervision and control of the instructor.

It is still another object to provide a matrix-switching assembly uniquely constructed to minimize the number of soldered connections, improve reliability of switching, reduce the size of the switching assembly over prior art devices, facilitate switching operations, and maintain costs of manufacture and operation thereof to a minimum.

Other objects will become apparent as the description proceeds.

The above-mentioned and other features and objects of this invention and the manner of attaining them will become more apparent and the invention itself will be best understood by reference to the following description of an embodiment of the invention taken in conjunction with the accompanying drawings, wherein.

Figure 2:
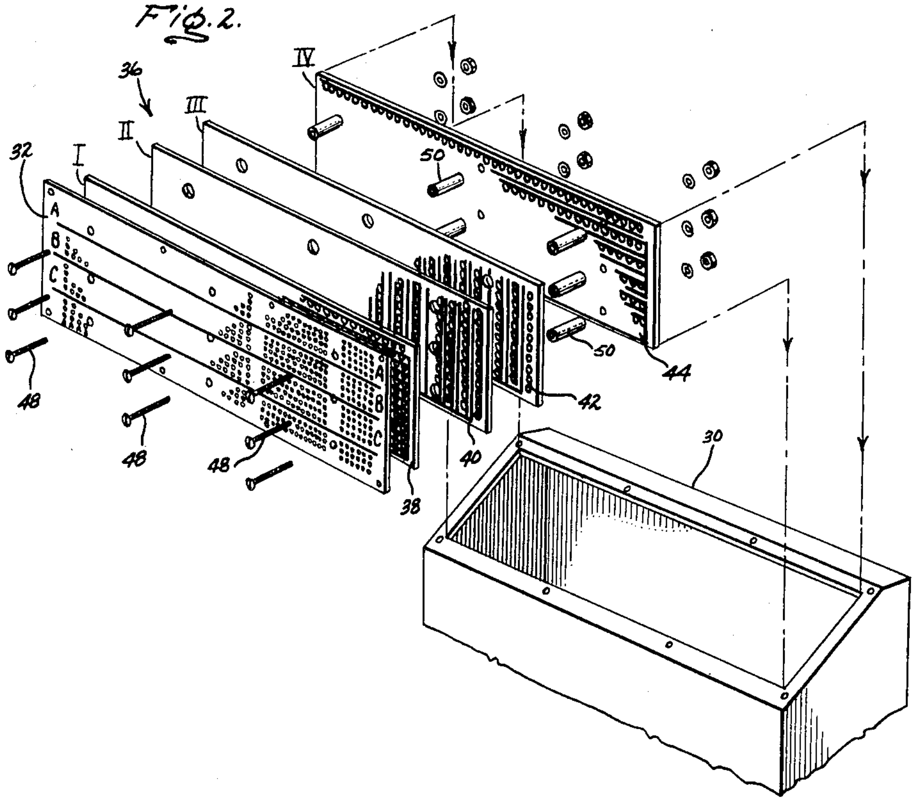
FIG. 2 is an exploded view of the matrix-switching assembly, installed in the console of FIG. 1.
Figure 1:
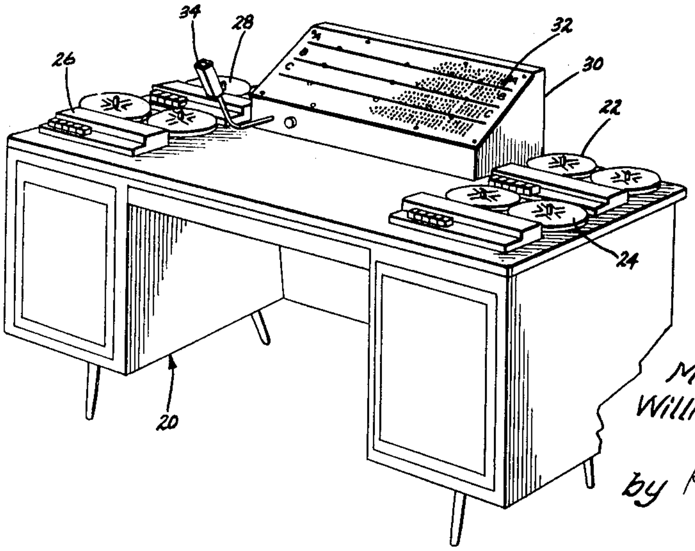
FIG. 1 is a perspective illustration of the instructor's console which contains a major portion of the equipment used in the entire system of this invention, this console being operated by the instructor in the control and supervision of the classroom instruction.

Referring to the drawings, and more particularly to FIG. 1, the teacher's console, indicated generally by the reference numeral 20, is in the form of a desk and contains almost all of the component circuitry in a complete system for use in teaching foreign languages to a class of, for example, thirty-six students. Mounted on the console top are a plurality of conventional magnetic tape decks, indicated generally by the numerals 22, 24, 26 and 28, respectively, and inside the console are mounted the instructor's amplifier as well as the student amplifiers and associated equipment. Located elsewhere in the classroom (not shown) are the student stations having at the individual locations essentially only a microphone, a volume control and a set of earphones for student use.

Also mounted on the console top is a small cabinet 30 having an inclined front panel 32, this cabinet containing a matrix-switching assembly as more clearly illustrated in succeeding FIGS. 2 through 11.

The instructor's console is also provided with a microphone 34 serving the purpose of providing teacher communication to students.

Referring now to FIGS. 2 through 11, the matrix-switching assembly housed in the cabinet 30 will now be described. This matrix-switching assembly is generally indicated by the reference numeral 36 and comprises a front panel 32 (see FIG. 7), four printed circuit boards 38, 40, 42 and 44, and a base panel 46 secured in stacked parallel relation and spaced apart as hereinafter described. A series of bolts 48 pass through the various panels and insulator boards and receive thereon suitable sleeve-like spacers 50 interposed between the respective panels and boards to secure the same apart a predetermined distance as illustrated more clearly in FIG. 4.

Figure 7:
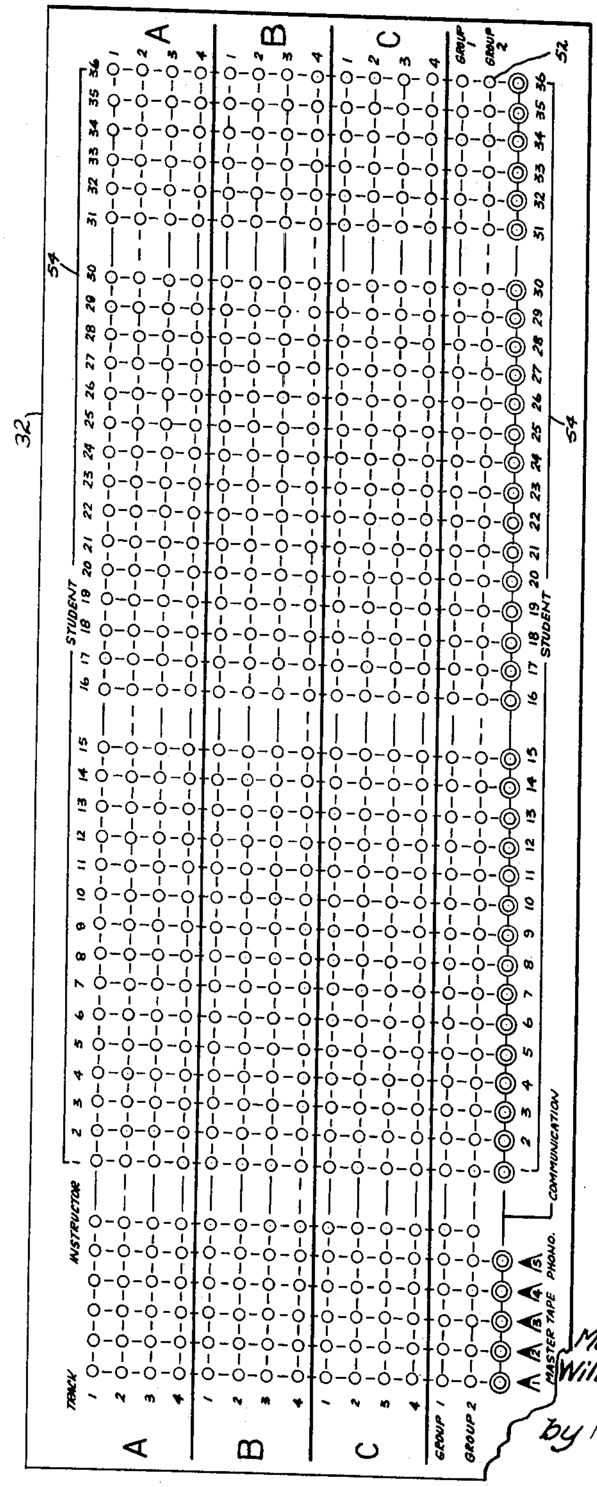
FIG. 7 is a front view of the control panel.

The panel 32 and the circuit boards 38, 40, 42 and 44 are provided with a plurality of apertures orthogonally arranged in columns and rows as illustrated in FIG. 7, all of these apertures in the panel and boards being arranged in identical patterns and in precise registry with each other. Thus, the apertures in the stacked assembly are aligned through the stack whereby a straight selector pin may be inserted completely therethrough as will be explained in more detail hereinafter. On the bottom panel 46 is mounted a plurality of copper-beryllium or the like detent springs 54 in registry with the apertures in the bottom board 44, these springs serving a purpose which will become apparent from the following description.

The panel 32, in addition to being provided with the plurality of apertures 52, has legending imprinted thereon as illustrated in FIG. 7. The major portion of the panel (i.e., the greater proportion of the apertures 52) is devoted to student positions, the word "STUDENT" being used in combination with bracket lines 55 to indicate those apertures related to student positions. In the panel of FIG. 7, it will be noted that thirty-six (36) student positions are provided for; however, it will appear as obvious to persons skilled in the art that any number of student positions may be used, depending upon the purposes to which the present invention is to be placed. Hereinafter, for purposes of convenience and brevity, only two student positions will be alluded to in the description, since the remaining student positions are duplicates, respectively, of these.

Figure 8:
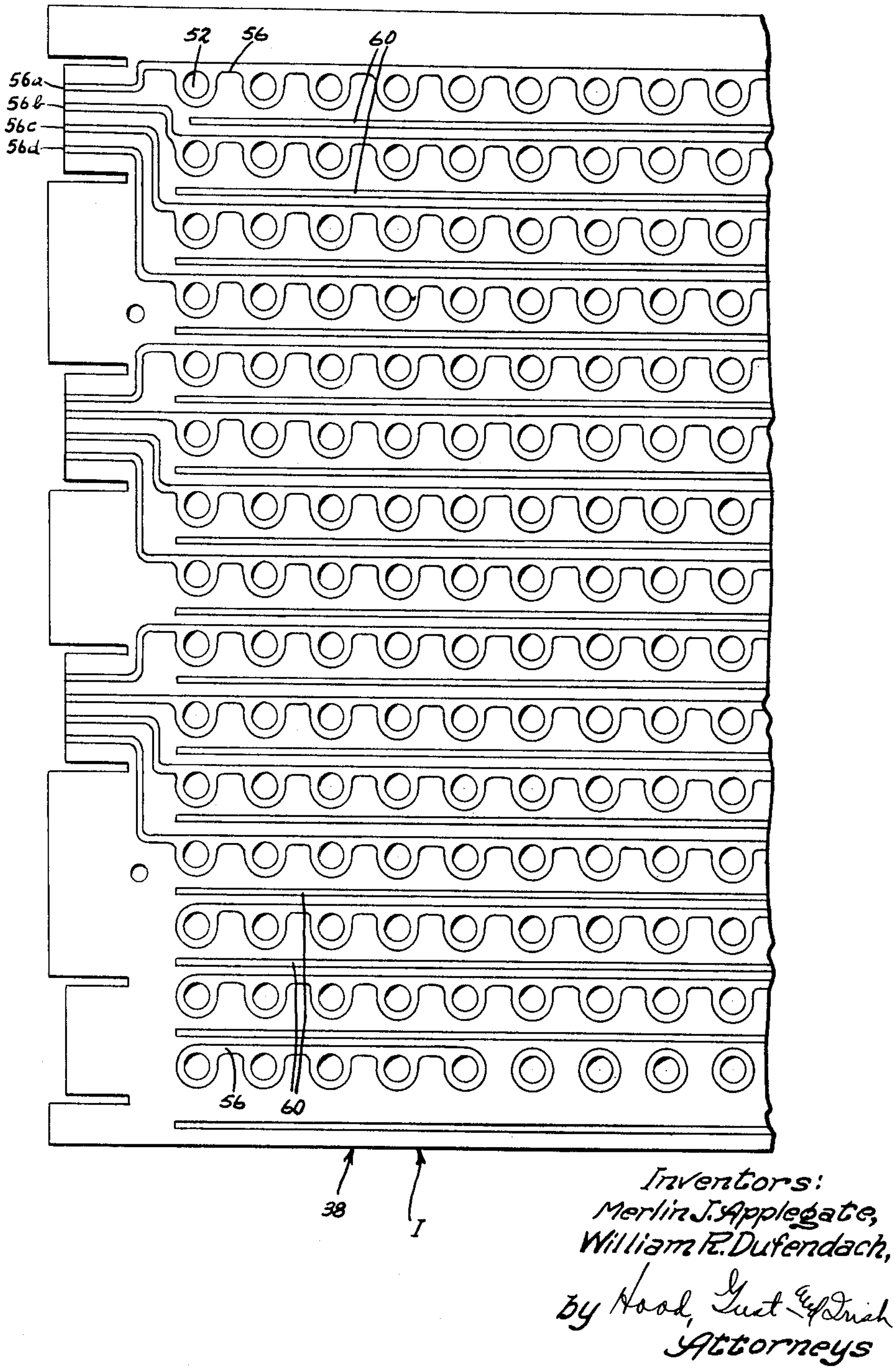
FIGS. 8, 9, 10 and 11 are front views of the four printed circuit boards, respectively, of the matrix-switching assembly of FIG. 2.

All of the matrix boards 38, 40, 42 and 44 have printed circuits thereon which register, in a precise manner, with the apertures in the respective boards. The circuit board 38 is illustrated in more detail in FIG. 8 and comprises a plurality of horizontal conductors 56 in registry with horizontal rows of apertures 52. Each aperture is provided with an eyelet or contact 58 (see FIG. 5) which physically resembles a metallic rivet, each eyelet making electrical contact with the respective horizontal conductor 56. Each eyelet, as obviously shown in FIG. 5, has an opening therethrough concentric with the respective aperture 52. As seen in FIG. 8, the eyelet contacts 58 are electrically connected together in horizontal, parallel rows for purposes which will become apparent from the following description.

In between the conductors 56 are disposed a plurality of second conductors 60 which are all conductively connected together and then to a reference ground potential for the purpose of minimizing electrical coupling or crosstalk between adjacent conductors 56. The conductors 56 and 60 are obviously insulated from each other by virtue of the fact that the board 38 is made of insulating material.

Figure 9:
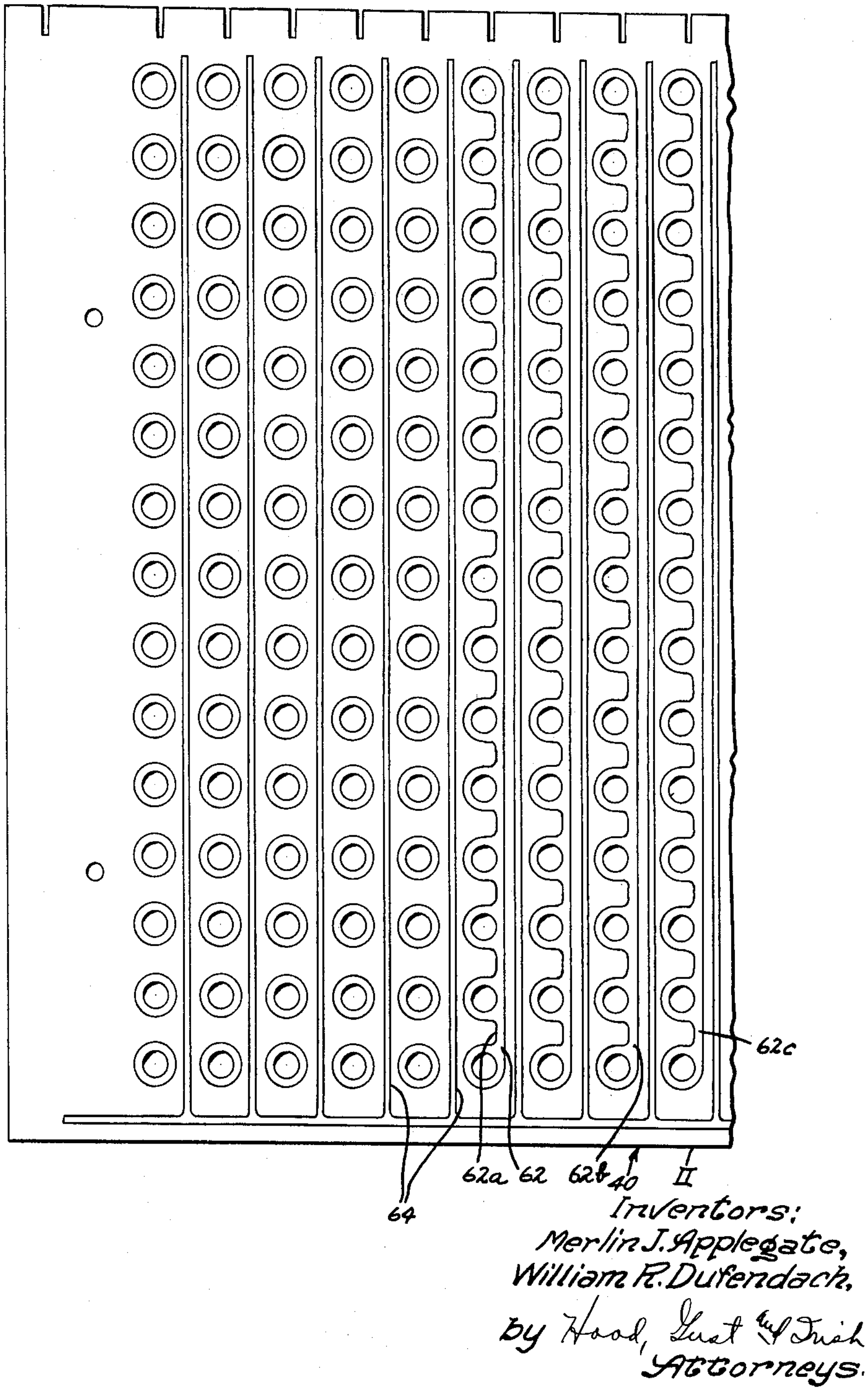

The board 40 is shown in detail in FIG. 9. It is provided with a series of vertically aligned and spaced-apart conductors 62 which interconnect respective eyelet contacts 58, each pair of these conductors 62 having interposed therebetween and insulated therefrom second conductors 64 which are all connected together and to a reference ground potential. As will be noted from a careful examination of this FIG. 9, the first five vertical rows of eyelet contacts 58 have no conductors 62 interconnecting the same; the reason for this will become apparent from the following description.

Figure 10:
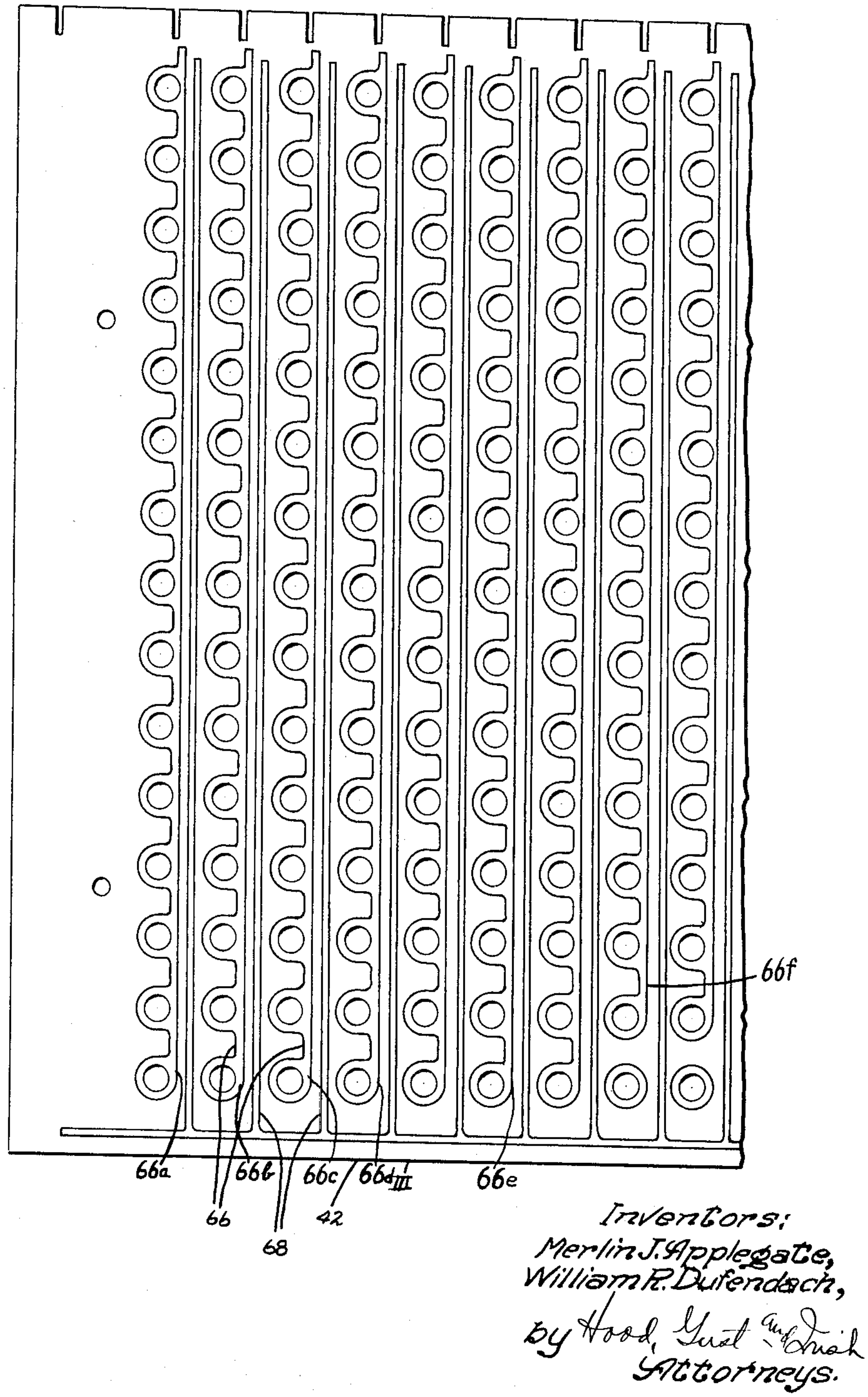

FIG. 10 illustrates the printed circuitry on the board 42. This board 42 closely resembles the board 40 of FIG. 9 in the respect that the eyelet contacts 58 are connected together in vertical, spaced-apart and parallel rows by conductors 66. These conductors 66 have interposed therebetween a plurality of other conductors 68 which are all connected together and grounded the same as previously described in connection with boards 38 and 40.

Figure 11:
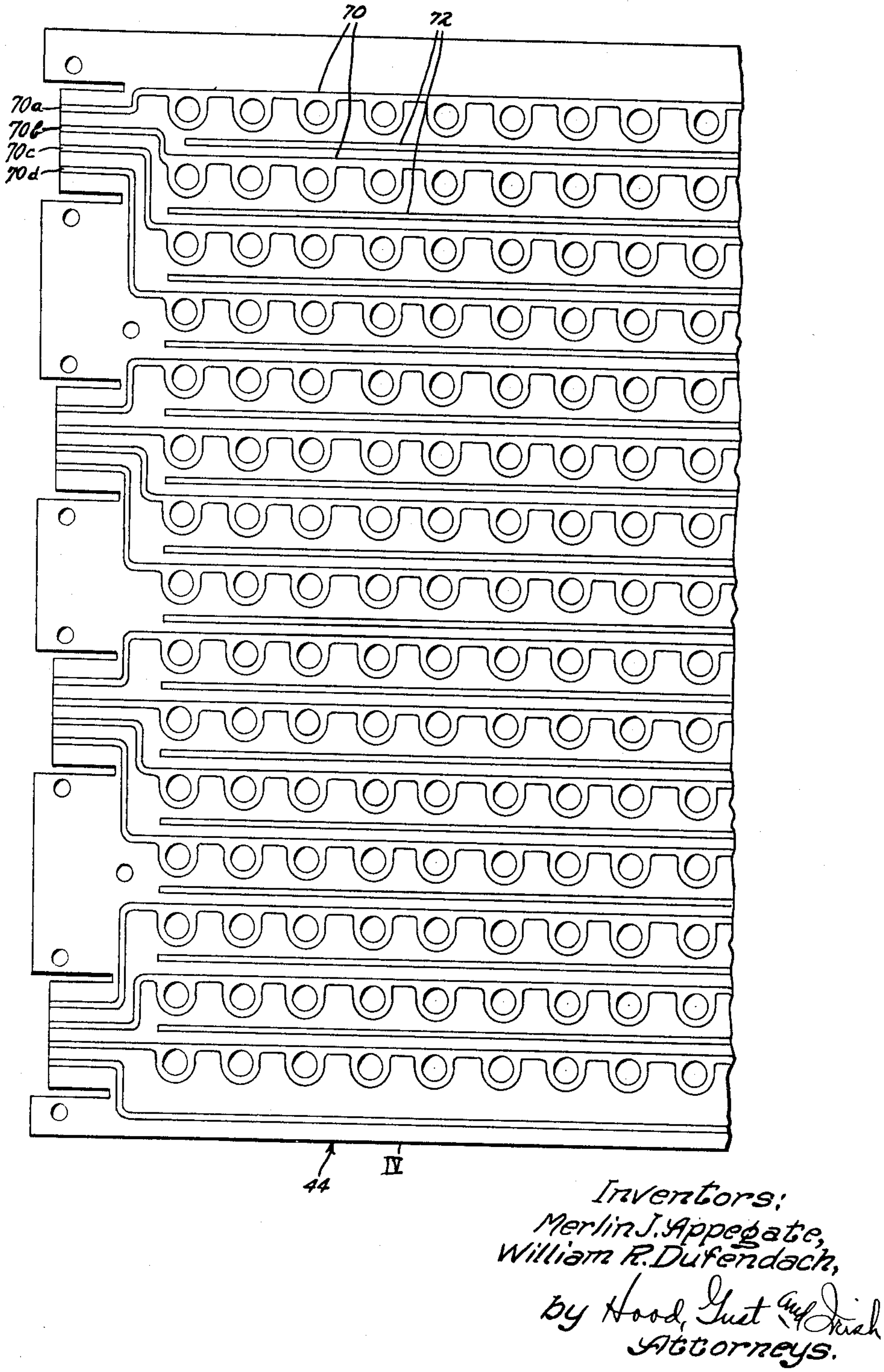

FIG. 11 illustrates the printed circuitry on the circuit board 44. This printed circuit closely resembles that of the board 38 (FIG. 8) in that horizontally arranged, parallel conductors 70 interconnect the horizontally aligned eyelet contacts 58. Interposed between these conductors 70 are a second series of conductors 72, all being connected together and grounded the same as in the preceding boards.

Figure 14:
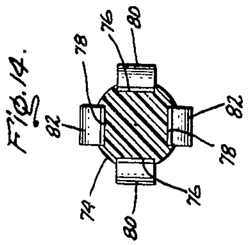
FIG. 14 is an end view of the selector pin of FIG. 12.
Figure 6:
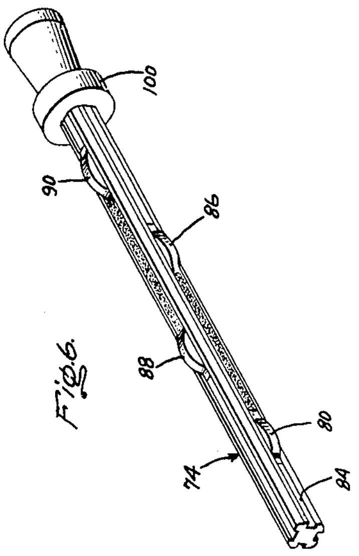
FIG. 6 is a perspective illustration of a selector pin.

Used in combination with the matrix-switching assembly 36 as just described are a plurality of selector pins 74, as shown more clearly in FIG. 6, made of some suitable insulating material, such as nylon or the like. Each pin is provided with four (4) longitudinally extending grooves spaced ninety degrees (90°) around the pin circumference. Two (2) of these grooves 76 are positioned diametrically opposite each other as shown more clearly in FIG. 14 as are the two grooves 78, the pair 76 being spaced angularly ninety degrees (90°) from the pair 78.

Secured in these grooves are respective metallic contacts. In the groove pair 76 are positioned two contacts 80, respectively, and in the groove pair 78 are positioned two identical contacts 82, respectively. Each contact 80, 82 is formed of an elongated strip of conductive spring metal, such as beryllium-copper, having a width substantially the same as the width of the companion groove 76, 78. The opposite end portions of the contacts are bowed upwardly to provide contact portions 84 and 86, respectively, for the contacts 80 and contact portions 88 and 90 for the contacts 82. The intermediate portions 94 and 96, respectively, of the two contacts 80 and 82 are adhered to the base of the respective grooves by some suitable insulating material, such as plastic, these intermediate portions 94 and 96 being thinner than the depth of the respective grooves so as to be recessed from the outer pin periphery. The importance of this recessing feature will become apparent from the following description.

The bowed portions 84, 86, 88 and 90 of the contacts are resilient and preformed to the shape illustrated in the drawings whereby they may be deflected radially inwardly and thereby exert a resilient outward contacting force.

Figures 3, 4, 5:
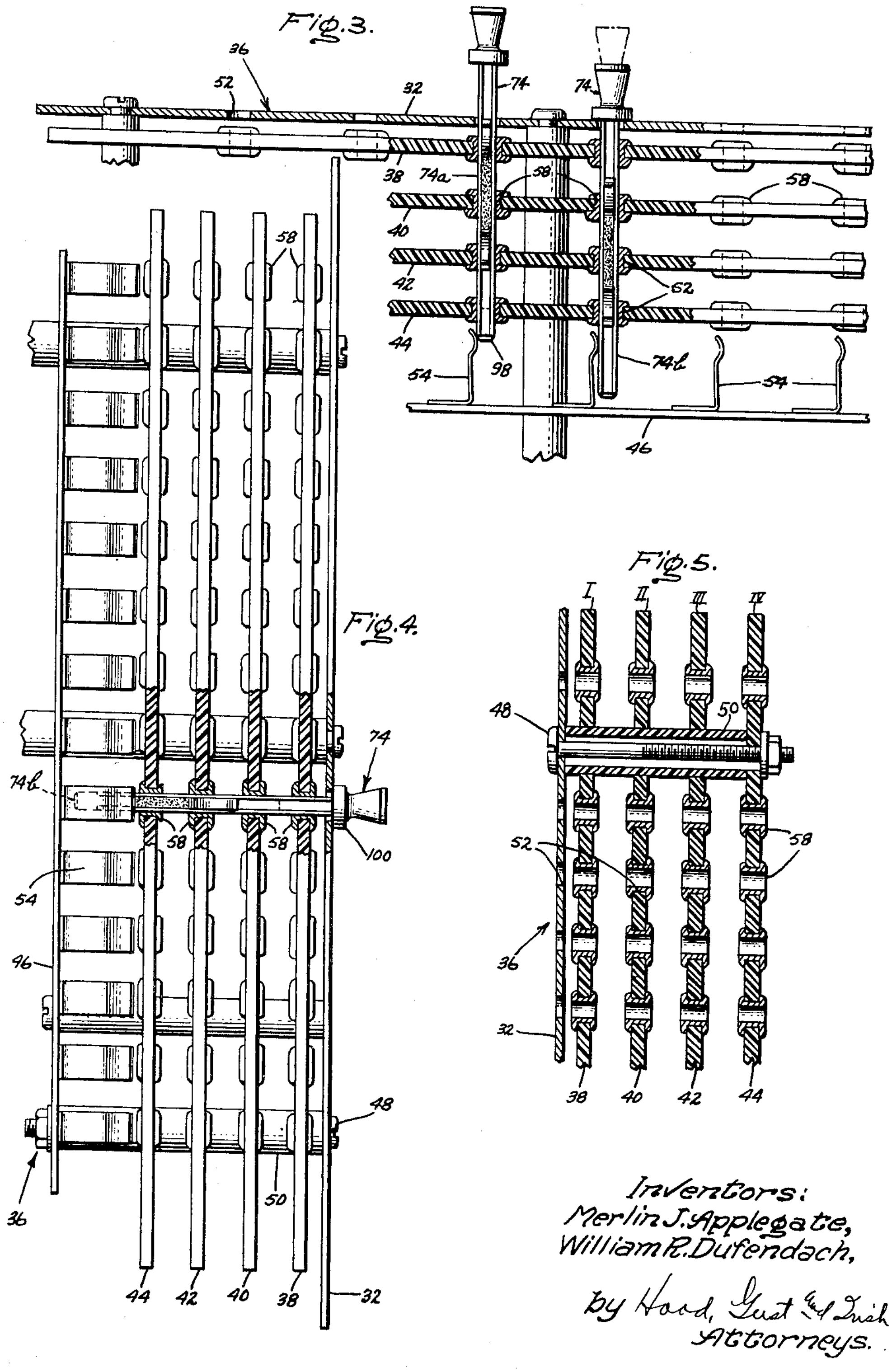
FIG. 3 is a side view of the matrix switching assembly with two different selector pins in two different positions respectively.
FIG. 4 is an end view of the matrix-switching assembly of FIG. 3 with a selector pin fully inserted.
FIG. 5 is a fragmentary, enlarged sectional view taken substantially along section line 5—5 of FIG. 3.
Figure 12:
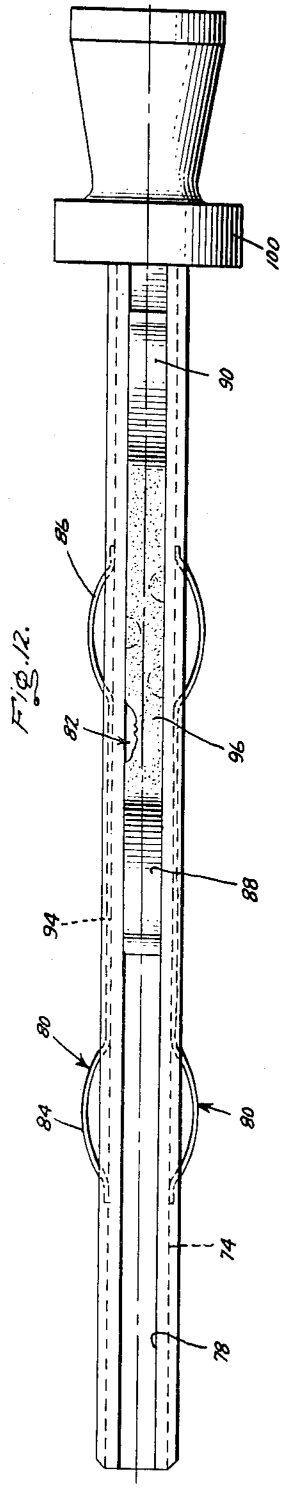
FIG. 12 is an illustration of a typical selector pin.
Figure 13:
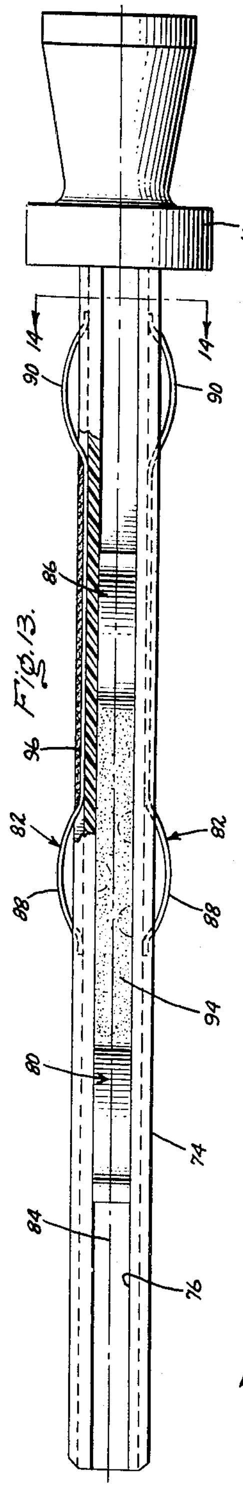
FIG. 13 is a view similar to FIG. 12 but rotated ninety degrees with respect thereto.

The selector pins 74 just described may now be considered in conjunction with the matrix switching assembly 36. As seen more clearly in FIGS. 3 and 4, the pin 74 may be inserted through the aligned apertures in the panel 32 and circuit boards 38, 40, 42 and 44. With the spring detents 54 disposed in registry with the apertures of the board 44, the distal end 98 of the pin 74 will first contact the detent spring 54 for resiliently resisting further inward or insertion movement of the pin 74. The operator inserting the pin can feel this resistance and thereby receive an indication of the depth to which the pin has been inserted into the matrix assembly. By forcing the pin 74, it may be inserted past the detent end of the respective spring 54 to the position of the pin indicated by the reference numeral **74*b*, the head 100 of the pin engaging the panel 32 as shown in FIG. 4 for limiting this depth of penetration. Thus, as will appear in the following description, the selector pin has two operating positions, the first position being indicated in FIG. 3 by the reference numeral 74*a* and the second position being indicated by the reference numeral 74*b***.

When the pin 74 is inserted to the half-way position of **74*a* (FIG. 3), the bowed contact portions 84 and 86 make contact with the eyelets of only printed circuit boards 38 and 42, respectively. The eyelets contacted in these two boards are thereby connected together. As will now be appreciated, the bowed portions 84 and 86 are spaced apart the same distance as the spacing between the two boards 38 and 42. Similarly, when the pin 74 is depressed to its "FULL DOWN" position (see FIGS. 3 and 4), the eyelets 58 in the two boards 40, 44 are connected together by the bowed contact portions 84 and 86 while the eyelets of the two boards 38 and 42 are connected together by the contact portions 88 and 90, respectively. Now again, it will be appreciated that the spacing between the boards 40 and 44 must conform to the distance between the contact portions 84 and 86, and the spacing between the boards 38 and 42 must correspond to the spacing between the contact portions 88 and 90, respectively. With the pin 74 depressed to its "FULL DOWN" position, the eyelets of boards 40 and 44** will be connected together nected together. The eyelets of adjacent boards are never connected together.

A multiplicity of pins 74 are used to make desired system connections.

In the operation of the entire system, the instructor may sit at the console 20 of FIG. 1 during the full time of operation. All of the tape decks 22, 24, 26 and 28 are easily within the instructor's reach and control, as is the matrix-switching assembly 36. The switching panel 32 (FIG. 7) is conveniently and clearly imprinted with the necessary system data whereby the instructor by the mere insertion of selector pins into the proper apertures may complete various circuits as already explained. The panel of FIG. 7 is set up to handle a total of thirty-six (36) students, twelve (12) record-playback channels, four (4) master lesson channels, an instructor's channel, a phonograph input channel, and circuits denominated "GROUP 1" and "GROUP 2" whereby the instructor may communicate with either one or two groups of the thirty-six students simultaneously or separately.

The achievement of these innumerable possible circuit combinations is attributable to the unique switching matrix 30 which makes use of printed circuits and avoids all use of rotary and the like switches. Through the use of this unique switching apparatus, a very large percentage of the soldered connections which would normally be used are eliminated. For example, for a class of thirty-six students, a total of nine hundred sixty-nine (969) soldered connections would be needed for a total of fifty-one (51) rotary type switches. The matrix switching assembly 36 of this invention requires only ninety-six (96) connections and these are made at the edges of the circuit boards. The chance of making poor soldered connections is reduced by a ratio of approximately 11 to 1.

Also, the reliability and ruggedness of the system are improved while at the same time the size of the overall assembly is reduced. There is also accomplished a more facile selection of a particular program or circuit combination and the identification of the same. The total system provides all of the electronic facilities needed without placing any kind of an unusual operating burden on the instructor. This system provides for complete flexibility in the utilization of all of these electronic facilities. Of primary importance is the fact that this flexibility provides for individualized instruction in a classroom containing a multiplicity of students, this individualized instruction permitting the students to progress as rapidly as their individual abilities will permit.

While we have described above the principles of our invention in connection with specific apparatus, it is to be clearly understood that this description is made only by way of example and not as a limitation to the scope of the invention.

What is claimed is:

1. A matrix-switching assembly comprising four sheet-like boards of insulating material, said boards being secured together in parallel spaced-apart relationship, all of said boards having apertures therein, said apertures in in a given board being spaced apart and arranged in a predetermined pattern, the aperture patterns for the remaining boards being identical and aligned in registry with each other, said apertures being provided with contacts, the contacts of the respective boards being further arranged into a plurality of separate groups, the contacts of each group being conductively connected together, and a plurality of selector pins individually insertable through a respective set of registered apertures in the four boards, said pins being selectively movable in said apertures to first and second positions, said pins each having a circuit connector thereon which is engageable with the contacts of the respective apertures receiving the pin, means including said circuit connector for interconnecting the contacts of only two alternate boards when the pin is moved to said first position and for interconnecting the contacts of the same two as well as the contacts of the remaining two alternate boards when the pin is moved to said second position, whereby the contacts of the different boards may be connected in circuit with each other.

2. A matrix-switching assembly comprising four sheet-like boards of insulating material, said boards being secured together in parallel spaced-apart relationship, all of said boards having apertures therein, the apertures in each board being spaced apart orthogonally equal distances, said apertures lying along first and second sets of lines, the first set of lines being parallel to each other, the second set of lines being parallel to each other and orthogonal with respect to said first lines, said apertures being disposed at the intersections respectively of said lines, the pattern of apertures in the boards being identical and in registry, said apertures having contacts, the contacts of the respective lines being connected together, and a plurality of selector pins individually insertable to first and second positions through a respective set of registered apertures in the four boards, said pins each having circuit connecting means thereon selectively engageable with the contacts of the respective apertures receiving the pin for electrically interconnecting the contacts of one alternate pair of boards for the first position of said pin and for electrically interconnecting the same contacts of said alternate pair and the remaining two contacts of the other alternate pair of boards for the second position of said pin, whereby the contacts of the different boards may be connected in circuit with each other.

3. A matrix-switching assembly comprising four sheet-like boards of insulating material, said boards being secured together in parallel spaced-apart relationship, all of said boards having apertures therein, the apertures in each board being spaced apart orthogonally equal distances, said apertures lying along first and second sets of lines, the first set of lines being parallel to each other, the second set of lines being parallel to each other and orthogonal with respect to said first lines, said apertures being disposed at the intersections respectively of said lines, said apertures having eyelet contacts secured therein, all of said boards having printed circuits thereon; the printed circuits on two of said boards including a plurality of spaced-apart parallel conductors coinciding with said first lines respectively, said conductors being connected to all of the contacts in the respective lines of one of said two boards and to preselected contacts in the respective lines of the other of said two boards; the printed circuits on the two remaining boards including a plurality of spaced-apart parallel conductors coinciding with said second lines respectively, these last-mentioned conductors being connected to preselected contacts of said second lines; a plurality of second conductors on said two boards extending parallel to and interlaced between said first lines, said second conductors being connected together and insulated from the first-mentioned conductors; a plurality of third conductors on said two remaining boards extending parallel to and interlaced between said second lines, said third conductors being connected together and insulated from the conductors on said two remaining boards, said second and third conductors being connected together for providing a common ground potential thereto, and a plurality of selector pins individually insertable through a respective set of registered apertures in the four boards, said pins each having a circuit connector thereon which is engageable with the contacts of the respective apertures receiving the pin, whereby the contacts of the different boards may be connected in circuit with each other.

4. The matrix-switching assembly of claim 3 wherein endmost boards constitute the first-mentioned two boards and the two intermediate boards constitute the remaining two boards, the circuit connector on each of said selector pins engaging the contacts of only the alternate boards, respectively.

5. The matrix-switching assembly of claim 3 and including a detent-supporting panel secured to one of the endmost of the four boards, said panel being spaced from and parallel to said boards, said panel carrying a plurality of detent springs in registry with the apertures respectively of said endmost board; each said selector pin having two circuit connectors thereon which are insulated from each other, each of these circuit connectors having two interconnected contact elements spaced apart a distance equal to the distance between alternate ones of said boards, said two circuit connectors being spaced apart with respect to each other by a distance equal to the spacing between adjacent ones of said boards whereby one of said connectors establishes a circuit connection between the respective contacts of two alternate boards and the other of said connectors establishes a circuit connection between the respective contacts of the two remaining alternate boards; each said detent spring having an interference portion thereon engageable by the end of the respective selector pin when said pin is inserted in the respective set of apertures just far enough to connect the respective contacts of only said two alternate boards.

6. A selector pin comprising an elongated member of insulating material, said member having four longitudinally extending grooves, said grooves being spaced apart by ninety degrees about the circumference of said member, a connector mounted in each groove, the connectors in opposite grooves being directly opposite each other, respectively, one pair of connectors being longitudinally offset from the other pair of connectors by a predetermined distance, each connector comprising an elongated strip of metal, the opposite ends of said strip being bowed outwardly from said member, the intermediate portion of said strip being disposed within the respective groove, whereby the opposite ends of said strip constitute contacts while the intermediate portion constitutes a connection therebetween.

7. A selector pin comprising an elongated member of insulating material, said member having two longitudinally extending and angularly spaced grooves, a connector mounted in each groove, said connectors being longitudinally offset from each other by a predetermined distance, each connector comprising an elongated strip of metal, the opposite ends of said strip being bowed outwardly from said member, the intermediate portion of said strip being disposed within the respective groove, whereby the opposite ends of said strip constitute contacts while the intermediate portion constitutes a connection therebetween.

8. A selector pin comprising an elongated member of insulating material, and two connectors on said member, said connectors being longitudinally and angularly offset from each other, said connectors being elongated and extending longitudinally of said member, each connector having exposed contact portions at the opposite ends thereof, the intermediate portion of each connector constituting a connection between said contact portions.

References Cited by the Examiner

UNITED STATES PATENTS

| | | | |
|---|---|---|---|
| 249,574 | 11/1881 | Blake | 317—112 |
| 486,506 | 11/1892 | Scribner | 317—112 |
| 840,537 | 1/1907 | Weir | 339—18 X |
| 1,243,922 | 10/1917 | Currier | 317—112 |
| 1,946,889 | 2/1934 | Weesel | 339—18 |
| 2,467,727 | 4/1949 | Brown. | 339—18 |
| 2,616,994 | 11/1952 | Luhn. | |
| 2,885,495 | 5/1959 | Sziklai et al. | 330—17 |
| 2,927,275 | 3/1960 | Hermann et al. | 330—17 |
| 2,963,535 | 12/1960 | Wegener et al. | 174—68.5 X |
| 3,065,439 | 11/1962 | Krause | 339—18 |

JOSEPH D. SEERS, *Primary Examiner.*

PATRICK A. CLIFFORD, *Examiner.*